United States Patent Office 3,745,022
Patented July 10, 1973

3,745,022
DRY INSTANT COMPOSITION FOR
GRAINED CONFECTIONS
Charles Burton Broeg, Short Hills, N.J., and Anthony
Monti, Irvington, and John P. Troy, Hicksville, N.Y.,
assignors to SuCrest Corporation, New York, N.Y.
No Drawing. Filed Oct. 30, 1970, Ser. No. 85,790
Int. Cl. A23g 3/00
U.S. Cl. 99—134 G
8 Claims

ABSTRACT OF THE DISCLOSURE

A dry mix for a grained confection product comprises sugar and a fat having a setting point in the range of from above about room temperature to about 110° F., preferably 90 to 100° F., and having a rapid crystallization rate. The mix is blended with sufficient water to fluidize the mix, but not dissolve the ingredients, at a temperature only slightly above the setting point of the fat and, after the moist mixture is formed into the desired configuration, it is cooled to solidify it.

---

This invention relates to novel sugar-containing compositions, particularly grained confections whose sugar is partly or wholly in a crystal state, such as fondant creams, fudge, semi-chewing and grained caramels, grained nougats, grained mints and similar products containing a sugar as the major component. More particularly, this invention is concerned with dry sugar-containing compositions which, upon mixing with water, are converted to a grained confection product.

It has long been the practice to prepare sugar-based confections by dissolving sugar and other ingredients in water, boiling off the excess water to achieve a desired solids level, and thereafter cooling the hot aqueous mixture to cause the mixture to set up. In such processes, the set is caused by crystallization of sugar from the hot aqueous solution upon cooling.

Considerable effort has been expended to develop dry compositions which can be employed to produce grained confection products merely upon mixing with water and without the need for boiling. For example, Whittier, in U.S. 2,651,574, has proposed forming a mixture of sucrose, anhydrous lactose and other ingredients, mixing this mixture with water to form a paste and then allowing the mixture to stand, whereby setting occurs as the lactose combines with water to form a crystalline monohydrate. It does not appear, however, that this procedure was ever used commercially, and it possesses certain drawbacks. In particular, the process apparently requires a considerable period of time for the set to develop, and a large proportion of the mixture comprises lactose, which is not as effective a sweetener as sucrose. As a result, it is difficult to prepare mixes having taste characteristics which are similar to those obtained by procedures involving boiling. As a result, the only "instant" mixes known to applicants which, prior to this invention, had any commercial use were those obtained by carefully drying a confection composition produced in the conventional fashion, i.e. boiling and cooling, and thereafter pulverizing the dried product.

It is an object of this invention to provide a product which is readily and rapidly converted to a grained confection product upon mixing with water.

It is a further object of this invention to provide a product which, upon mixing with water, is converted to a grained confection product without requiring crystallization of sugars to provide set.

Still other objects of the present invention will be apparent from the ensuing specification and claims.

Briefly, the objects of this invention are achieved by providing a mixture including at least one edible fat having a setting point of only slightly above normal room temperature (about 72° F.). More particularly, the fats which are used in accordance with this invention are those having setting points above room temperature up to about 110° F., and preferably in the range of from about 90 to about 100° F.

A second characteristic of the fats which are used in accordance with this invention is that they have a rapid setting or crystallization rate. In particular, fats which are useful are those which, upon cooling from a molten state to their setting point, crystallize in less than about 15 minutes, as evidenced by the change in appearance of the fat from a clear, transparent molten state to an opaque, solid state. Particularly preferred fats are those whose crystallization time is less than about 10 minutes. Fats meeting these criteria include hydrogenated vegetable fats, including fats sold commercially under the trademarks Drewtex and Kristel Gold.

The proportion of fat which is employed in the dry product of this invention is not narrowly critical, provided it is present in sufficient amount to provide the desired degree of set in a short time. In most cases, this amount will be at least about 2 weight percent of the dry formulation. The maximum amount of fat is dictated only by the desired taste characteristics of the final product, and normally amounts in excess of about 20 weight percent are undesirable. In most cases a dry mix containing from about 4 to about 8 weight percent fat has been found satisfactory.

The other essential component of this dry composition is a crystalline sugar of a type and physical form sufficient to yield the desired taste characteristics in the final product. That is the sugar or sugars should be such as to provide the degree of sweetness and graininess desired in the final product. In most cases the sugar will comprise at least about 60 weight percent, and preferably at least about 75 percent, of the dry mixture.

At least about 70 percent, and preferably at least about 90 percent, of the sugar fraction of the dry product is sucrose. The remaining sugar content may be dextrose, lactose, fructose or other sugar. In all cases, however, the sugar is desirably in a crystalline form.

The particle size of the sugar is dependent upon the particular sugar and the degree of graininess desired in the final product. In the case of sucrose, no more than about 10 percent should have a particle size of greater than about 325 mesh, and where no graininess is desired at all, essentially all (i.e. 99.9+%) of the sucrose particles should be less than about 325 mesh. It should be noted that the particle sizes referred to here are those of the sugar crystals, and need not be the size of the sugar material which is added. Thus sugar agglomerates having sizes substantially in excess of the above-mentioned values may be employed. In such case, however, the agglomerates should be formed from sugar crystals (or pulverized sugar) having the specified particle size and the agglomerates should readily break up upon admixture with water to yield the individual sugar particles. A particularly preferred agglomerate for use in the products of this invention is Nulofond, a product sold by SuCrest Corporation and made in accordance with U.S. Pat. No. 3,518,095 issued June 30, 1970.

In addition to the fat and the sugar, the composition may contain other additives, such as milk solids, cocoa, vanilla, butter, salt, and the like to provide a product having the desired flavor, color and consistency, and these ingredients are admixed in the proportions necessary to achieve the desired result. These proportions are readily determined by one of ordinary skill in the art and except for the amount of quick setting fat discussed above, form no part of this invention.

The dry mix is converted to a grained confection product by mixing with relatively small amounts of water. In the conventional processes the solids are mixed with about 20 to 25 percent water and, after boiling, the water content of the product will ordinarily be about 8 to 10 percent. In the present case, the dry mix of this invention is mixed with water only in an amount sufficient to plasticize the mixture and make it fluid. Desirably the amount of water should not be sufficient to dissolve any of the ingredients of the dry mix. In general the water constitutes about 2 to about 9, preferably about 4 to 5, weight percent of the completed product (dry mix+water).

The water and the dry mix are admixed in any suitable manner. In a preferred technique, the mixing is effected under conditions of low shear and high compression. Apparatus providing such conditions include screw-type extrusion apparatus.

The mixing is effected at a temperature above the setting point of the fat, and preferably between the setting and melting point of the fat, so that at least a portion of the fat is molten. Heating may be effected in any suitable manner, but when low shear, high compression mixers are employed, sufficient heat is generated through mechanical working and auxiliary heating ordinarily is unnecessary.

After mixing, the fluid mixture is formed into the desired configuration and cooled, whereby the fat solidifies, causing the composition to set. In a preefrred technique the mixture is extruded into a column of desired cross-section and, after the extruded mixture has solidified, cut into pieces of the desired size.

The following examples are illustrative. In the examples, Drewtex is a hydrogenated all-vegetable oil having a Wiley Melting Point of 114° F. and a setting point of 91–94° F. marketed by Drew Foods Division of Drew Chemical Corp., and Kristel Gold is an all vegetable shortening having a Wiley Melting Point of 101–105° F. and a setting point of 90–92° F., marketed by Durkee Industrial Foods. Nulofond is a sugar agglomerate containing sucrose and 2 to 4½ percent invert sugar and less than 0.5 percent moisture having an average particle size of 25 microns. All parts and percents are by weight unless otherwise specified.

EXAMPLE I

Semi-chewy caramel-type confection

A blend of 740 parts of Nulofond, 60 parts of Drewtex, 100 parts of chocolate liquor, 50 parts of corn syrup solids (42 dextrose equivalents (D.E.)), 40 parts of dried whole milk, 100 parts of hydrolyzed cereal solids (10 D.E.), 10 parts of vanilla and 2.5 parts of salt was prepared in a suitable mixer. A 500-gram portion of this blend and 30 ml. of water were added to a low shear, high compression mixer and, after mixing for 12 minutes, at which time the temperature of the product was 95–100° F., the product was extruded through an orifice as a bar of ½ inch by 2½ inches cross-section. After standing 7 minutes at ambient conditions the bar was wire cut into pieces ½ inch by 1¼ inch by 1 inch and was ready for eating or packing.

EXAMPLE II

Fine grained fudge type confection

Employing procedures and apparatus similar to those described in Example I, a blend of 708 parts of Nulofond, 105 parts of Kristel Gold, 82 parts of grated chocolate naps, 50 parts of corn syrup solids (42 D.E.), 45 parts of dried whole milk, 10 parts of vanilla and 2.5 parts of salt was prepared and a 500-gram portion of the blend was mixed with 35 ml. of water for 12 minutes. The extruded product was wire cut after 7 minutes and was ready for eating or packing.

EXAMPLE III

Coarse grained fudge type confection

Employing procedures and apparatus similar to those described in Example I, a blend of 300 parts of Nulofond, 160 parts of sugar, 300 parts of dextrose hydrate, 40 parts of Drewtex, 0.5 part of butter flavor, 2.5 parts of glycerol monostearate, 2.5 parts of calcium stearate, 70 parts of cocoa, 60 parts of corn syrup solids, 47 parts of dried whole milk, 7.5 parts of vanilla, and 2.5 parts of salt was prepared, pulverized to 90 percent through 200 mesh, and a 3-pound portion of the pulverized blend was mixed with 123 grams of water and 1½ ounces of butter for 15 minutes. The extruded product was wire cut after 7 minutes and was ready for eating or packing.

What is claimed is:

1. A dry instant grained confection mixture comprising sugar and fat adapted to be formed into a grained confection selected from the group consisting of fondant creams, fudge, caramel, nougat, and mint whose sugar is partly or wholly in a crystal state by admixing said dry mixture with water in an amount sufficient to provide a mixture having a water content of from about 2 to about 9 percent, said mixing being effected at a temperature slightly above the setting point of said fat and thereafter cooling said mixture whereby setting of said confection is effected by the setting of said fat and not by the crystallization of sugar, said dry mixture having as essential components:
    (a) a major portion of sugar, of which at least about 70 percent is sucrose, at least 90 percent of said sucrose having a particle size of not greater than 325 mesh; and
    (b) from 2 to about 20 percent of a fat having a setting point in the range of from about room temperature to about 110° F. and a setting rate of not more than about 15 minutes.

2. A composition according to claim 1 wherein the setting point of said fat is in the range of from about 90° F. to about 100° F.

3. A composition according to claim 1 wherein said sugar constitutes at least about 60 percent of said mixture.

4. A method for forming a grained confection selected from the group consisting of fondant cream, fudge, caramel, nougat, and mint whose sugar is partly or wholly in a crystal state comprising:
    (a) admixing
        (1) a dry mix comprising:
            (a) a major proportion of sugar, of which at least about 70 percent is sucrose, at least 90 percent of said sucrose having a particle size of not greater than about 325 mesh; and
            (b) from 2 to about 20 percent of a fat having a setting point in the range of from about room temperature to about 110° F. and a setting rate of not more than about 15 minutes; with
        (2) water in an amount such that the water content of the resulting mixture is in the range of from about 2 to about 9 weight percent, said admixing being effected at a temperature greater than the setting point of said fat, and
    (b) cooling the resulting mixture to a temperature below the setting point of said fat to form said confection, whereby setting of said confection is effected by the setting of said fat and not crystallization of sugar.

5. A method according to claim 4 wherein the water content of said resulting mixture is in the range of from about 4 to about 5 weight percent.

6. A method according to claim 4 wherein said mixing is effected under conditions of low shear and high compression sufficient to generate the heat required to heat the mixture to its mixing temperature.

7. A method according to claim 4 wherein said mixture is extruded as a column having a desired cross-section at a temperature above the setting point of said fat and said extruded mixture is then cooled.

8. A method according to claim 4 wherein said mixing is effected at a temperature of between the setting and melting points of said fat.

References Cited
UNITED STATES PATENTS

| | | | |
|---|---|---|---|
| 2,598,282 | 5/1952 | Melnick | 99—139 |
| 2,824,808 | 2/1958 | Gillett et al. | 99—134 G |
| 3,512,995 | 5/1970 | Reed et al. | 99—134 G |

RAYMOND N. JONES, Primary Examiner

J. M. HUNTER, Assistant Examiner